(12) United States Patent
Jung et al.

(10) Patent No.: US 9,396,590 B2
(45) Date of Patent: Jul. 19, 2016

(54) IMAGE PROCESSING APPARATUS AND METHOD FOR THREE-DIMENSIONAL IMAGE ZOOM

(71) Applicant: SAMSUNG ELECTRONICS CO., LTD., Suwon-si, Gyeonggi-do (KR)

(72) Inventors: Seung Won Jung, Seoul (KR); Ouk Choi, Yongin-si (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 389 days.

(21) Appl. No.: 13/974,677

(22) Filed: Aug. 23, 2013

(65) Prior Publication Data

US 2014/0253542 A1 Sep. 11, 2014

(30) Foreign Application Priority Data

Mar. 8, 2013 (KR) .................. 10-2013-0024936

(51) Int. Cl.
*G06T 19/20* (2011.01)
*G06F 3/0481* (2013.01)
*G06T 3/40* (2006.01)

(52) U.S. Cl.
CPC ............. *G06T 19/20* (2013.01); *G06F 3/0481* (2013.01); *G06T 3/40* (2013.01); *G06T 2219/2016* (2013.01)

(58) Field of Classification Search
None
See application file for complete search history.

(56) References Cited

U.S. PATENT DOCUMENTS

| 6,798,406 | B1 | 9/2004 | Jones et al. | |
|---|---|---|---|---|
| 8,213,711 | B2 | 7/2012 | Tam et al. | |
| 2002/0114535 | A1* | 8/2002 | Luo | G06K 9/3233 382/282 |
| 2009/0256837 | A1* | 10/2009 | Deb | G06T 19/003 345/419 |
| 2011/0007097 | A1* | 1/2011 | Williams | G06F 3/0481 345/661 |
| 2012/0242796 | A1 | 9/2012 | Ciurea et al. | |
| 2013/0321401 | A1* | 12/2013 | Piemonte | G01C 21/3635 345/419 |

FOREIGN PATENT DOCUMENTS

| KR | 10-2011-0045650 | 5/2011 |
|---|---|---|
| KR | 10-2011-0051074 | 5/2011 |

OTHER PUBLICATIONS

Kim, Donghyun, and Kwanghoon Sohn. "Depth adjustment for stereoscopic image using visual fatigue prediction and depth-based view synthesis." Multimedia and Expo (ICME), 2010 IEEE International Conference on. IEEE, 2010.*

* cited by examiner

*Primary Examiner* — Zhengxi Liu
(74) *Attorney, Agent, or Firm* — Harness, Dickey & Pierce, P.L.C.

(57) ABSTRACT

An image processing apparatus and method for zooming in on a partial area in a three-dimensional (3D) image selects a zoom mode from among a two-dimensional (2D) zoom mode, a 3D zoom mode, and an intermediate dimensional zoom mode between the 2D zoom mode and the 3D zoom mode. The image processing apparatus may include a mode selecting unit to select a zoom mode to be applied to a zoom area in a color image and a depth image among the 2D zoom mode, the 3D zoom mode, and the intermediate dimensional zoom mode between the 2D zoom mode and the 3D zoom mode, and a scaling unit to scale the zoom area using a zoom factor indicating magnification or minification of the zoom area and the selected zoom mode.

27 Claims, 9 Drawing Sheets

IMAGE PROCESSING APPARATUS AND METHOD FOR THREE-DIMENSIONAL IMAGE ZOOM

CROSS-REFERENCE TO RELATED APPLICATIONS

This application claims the priority benefit of Korean Patent Application No. 10-2013-0024936, filed on Mar. 8, 2013, in the Korean Intellectual Property Office, the disclosure of which is incorporated herein by reference.

BACKGROUND

1. Field

One or more embodiments disclosed herein relate to an image processing apparatus and method for three-dimensional (3D) image zoom, and more particularly, to an apparatus and method for scaling a zoom area in a color image and a depth image using a zoom mode among a two-dimensional (2D) zoom mode, a 3D zoom mode, and an intermediate dimensional zoom mode of the 2D zoom mode and the 3D zoom mode.

2. Description of the Related Art

Zooming is a technique that allows a user to view an object included in an image from a closer perspective or a farther perspective by magnifying or minifying a portion of the image, or the image as a whole. Accordingly, zooming is used to obtain a wide depth of field image with a camera or to give a special effect to a video.

As various techniques for three-dimensional (3D) image acquisition and display are being developed in recent times, a 3D image zoom technology is becoming a key technology for a 3D camera and a 3D display.

However, since a 3D image includes depth information dissimilar to a two-dimensional (2D) image, a traditional zoom technology fails to make an object included in a 3D image appear to be closer or farther away by increasing or decreasing a scale of a portion of the image, or the image as a whole.

Accordingly, there is a demand for a zoom technology that makes an object included in a 3D image appear to be closer or farther away.

SUMMARY

The foregoing and/or other aspects may be achieved by providing an image processing apparatus including a mode selecting unit suitable for, functional to, capable of, adapted to, or configured to select a zoom mode to be applied to a zoom area in a color image and a depth image among a two-dimensional (2D) zoom mode, a three-dimensional (3D) zoom mode, and an intermediate dimensional zoom mode between the 2D zoom mode and the 3D zoom mode, and a scaling unit suitable for, functional to, capable of, adapted to, or configured to scale the zoom area using a zoom factor indicating magnification or minification of the zoom area and the selected zoom mode.

The intermediate dimensional zoom mode may have a fewer number of calculations than the 3D zoom mode, and a likelihood of a distortion occurring in the zoom area.

The scaling unit may scale depth information of the zoom area based on the zoom factor when the intermediate dimensional zoom mode is selected.

The scaling unit may scale depth information of points included in the zoom area in inverse proportion to a size of the zoom area to be magnified when the scaling unit magnifies the zoom area using the zoom factor.

The mode selecting unit may estimate a range of depth information of the zoom area to be scaled using the intermediate dimensional zoom mode, and may select the intermediate dimensional zoom mode when a difference between the estimated range of depth information and a range of depth information of a current zoom area is less than or equal to a threshold value.

The mode selecting unit may determine the range of depth information based on a difference between a greatest amount of depth information and a least amount of depth information in the zoom area.

The scaling unit may shift depth information of the zoom area using the zoom factor when the 3D zoom mode is selected.

The scaling unit may generate a scaled color image and a scaled depth image by transforming 3D coordinates of the zoom area based on the zoom factor and by projecting the transformed 3D coordinates into a 2D space.

The mode selecting unit may estimate a range of depth information of the zoom area to be scaled using the intermediate dimensional zoom mode, and to select the 3D zoom mode when a difference between the estimated range of depth information and a range of depth information of a current zoom area exceeds a threshold value.

The scaling unit may scale a size of the zoom area in proportion to the zoom factor when the 2D zoom mode is selected.

The mode selecting unit may determine whether depth information of the zoom area to be scaled using the intermediate dimensional zoom mode or the 3D zoom mode is included in a depth range allowing a user to perceive a stereoscopic image, and may select the 2D zoom mode when the depth information of the zoom area to be scaled using the intermediate dimensional zoom mode or the 3D zoom mode is out of the depth range. For example, the depth range allowing the user to perceive the stereoscopic image may correspond to a predetermined depth zone which may correspond to a comfort zone or a Panum's fusional area in which fatigue experienced by a user viewing a 3D image is minimized.

The mode selecting unit may select the 2D zoom mode when the zoom area includes additional information of the color image or information lacking depth information.

The image processing apparatus may further include a zoom area setting unit suitable for, functional to, capable of, adapted to, or configured to set a zoom area of a color image and a zoom area of a depth image on an area in a 3D image based on a selection by a user, and a zoom factor setting unit suitable for, functional to, capable of, adapted to, or configured to set a zoom factor based on at least one piece of information among a result of analysis of color information and depth information in the zoom area, and information received from the user. For example, the zoom factor setting unit may limit a zoom factor based on a resolution of the 3D image.

The foregoing and/or other aspects may be achieved by providing an image processing apparatus including a zoom area setting unit suitable for, functional to, capable of, adapted to, or configured to set a zoom area in a color image and a depth image to be zoomed, and a scaling unit suitable for, functional to, capable of, adapted to, or configured to generate a scaled color image and a scaled depth image based on a selected zoom mode among a two-dimensional (2D) zoom mode, a three-dimensional (3D) zoom mode, and an intermediate zoom mode between the 2D zoom mode and the 3D zoom mode.

The scaling unit may transform 3D coordinates of the zoom area based on a zoom factor and by projecting the transformed 3D coordinates into a 2D space, when the 3D zoom mode is selected.

The scaling unit may transform the 3D coordinates of the zoom area by shifting depth information of the zoom area using the zoom factor, when the 3D zoom mode is selected.

The scaling unit may scale the depth information of the zoom area based on a zoom factor by scaling depth information of points included in the zoom area in inverse proportion to a size of the zoom area to be magnified, when the intermediate zoom mode is selected.

The scaling unit may scale the size of the zoom area in proportion to a zoom factor, when the 2D zoom mode is selected.

The foregoing and/or other aspects may be achieved by providing an image processing method including selecting a zoom mode to be applied to a zoom area in a color image and a depth image among a 2D zoom mode, a 3D zoom mode, and an intermediate dimensional zoom mode between the 2D zoom mode and the 3D zoom mode, and scaling the zoom area using a zoom factor indicating magnification or minification of the zoom area and the selected zoom mode.

The intermediate dimensional zoom mode may have a fewer number of calculations than the 3D zoom mode, and a likelihood of a distortion occurring in the zoom area.

The scaling may include scaling depth information of the zoom area based on the zoom factor when the intermediate dimensional zoom mode is selected.

The selecting of the zoom mode may include estimating a range of depth information of the zoom area to be scaled using the intermediate dimensional zoom mode, and selecting the intermediate dimensional zoom mode when a difference between the estimated range of depth information and a range of depth information of a current zoom area is less than or equal to a threshold value.

The scaling may include shifting depth information of the zoom area using the zoom factor when the 3D zoom mode is selected.

The foregoing and/or other aspects may be achieved by providing an image processing method including: setting a zoom area based on an area in an image selected by a user, selecting a zoom factor for the set zoom area based on an input from the user, and adaptively changing between zoom modes to be applied to the zoom area, among a plurality of zoom modes, in response to a change in the selected zoom factor, wherein the plurality of zoom modes include a two-dimensional (2D) zoom mode, a three-dimensional (3D) zoom mode, and an intermediate zoom mode between the 2D zoom mode and the 3D zoom mode.

The adaptively changing may include changing to the intermediate zoom mode or the 3D zoom mode based upon a likelihood of distortion occurring in the zoom area in the intermediate zoom mode.

The adaptively changing may include changing to the intermediate zoom mode or the 3D zoom mode based upon whether a just noticeable depth difference occurs in the intermediate zoom mode.

The adaptively changing between zoom modes may include: determining a first depth range of the zoom area by calculating a difference between minimum depth information and maximum depth information in the zoom area, determining a second depth range corresponding to the zoom area to be scaled based upon the selected zoom factor, by calculating a difference between minimum depth information and maximum depth information in the zoom area to be scaled, calculating a difference between the first depth range and the second depth range, and adaptively changing to the intermediate zoom mode or 3D zoom mode based upon the calculated difference between the first depth range and the second depth range.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
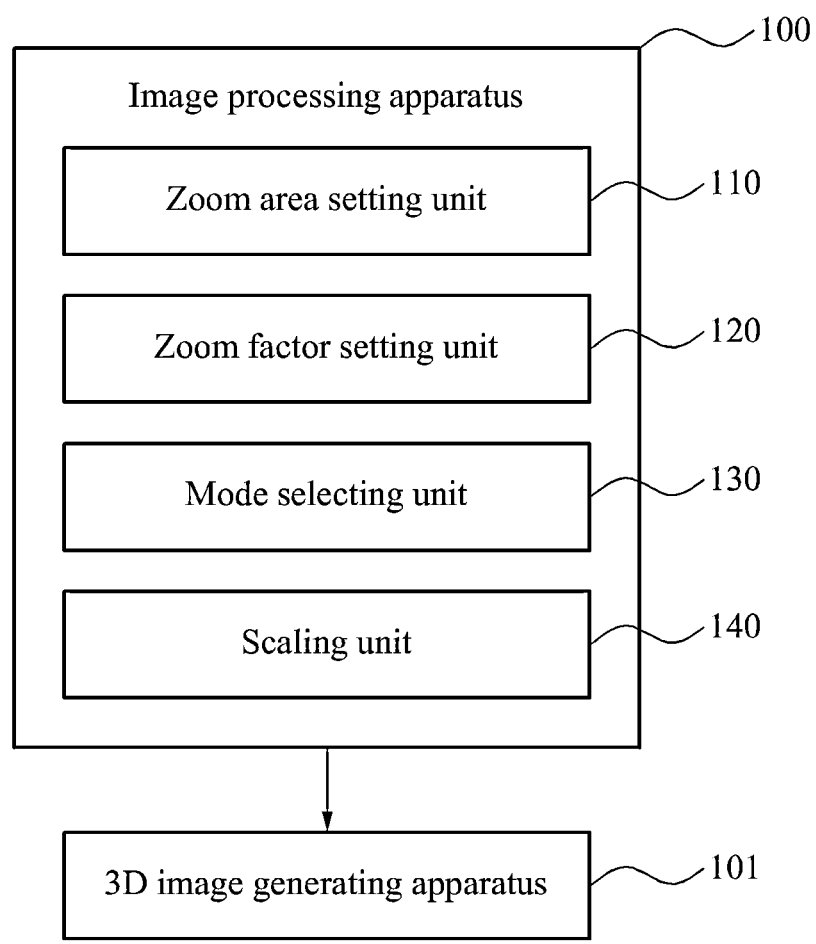
FIG. 1 illustrates a structure of an image processing apparatus according to an example embodiment.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an image processing apparatus 100 according to an example embodiment.

Referring to FIG. 1, the image processing apparatus 100 may include a zoom area setting unit (zoom setter) 110, a zoom factor setting unit (zoom factor setter) 120, a mode selecting unit (selector) 130, and a scaling unit (scaler) 140.

The zoom area setting unit 110 may set a zoom area to be zoomed in a color image and a depth image based on an area in a three-dimensional (3D) image selected by a user. More particularly, the zoom area setting unit 110 may identify an area in the color image and the depth image corresponding to the area selected by the user, and may set the identified area to be the zoom area.

In this instance, the user may select the area in the 3D image using a control device, for example, using one or more of a keyboard, a mouse, a touch screen, a remote control, and the like. For example, the control device may also include, a joystick, a button, a switch, an electronic pen or stylus, a body part, an input sound device (e.g., a microphone to receive a voice command), a track ball, a portable (e.g., a cellular or smart) phone, a tablet PC, a pedal or footswitch, a virtual-reality device, and so on. Also, the zoom area setting unit 110 may perceive the area selected by the user using a line of sight of the user or a region of interest (ROI).

More particularly, the zoom area setting unit 110 may perceive a line of sight of the user using a camera facing the user. The camera may be installed in (integrated with) a display device displaying the 3D image, or may be separate from the display device. As one of ordinary skill in the art would understand, the camera (e.g., a complementary metal-oxide-semiconductor (CMOS) or charge-coupled device (CCD)) may detect or recognize a user's behavior, figure, expression, gestures, and/or the position of the user, for example. Also, the zoom area setting unit 110 may identify an area viewed by the user using the perceived line of sight. In this instance, the zoom area setting unit 110 may determine the area viewed by the user to be the area selected by the user, and may set the viewed area to be the zoom area.

Also, the zoom area setting unit 110 may identify an area included in an ROI in the 3D image, may determine the area included in the ROI to be the area selected by the user, and may set the area included in the ROI to be the zoom area.

The zoom factor setting unit 120 may set a zoom factor indicating magnification or minification of the zoom area based on information input from the user. Also, the zoom factor setting unit 120 may analyze color information and depth information of the zoom area set by the zoom area setting unit 110, and may set the zoom factor based on a result of the analysis.

In this instance, the information input from the user to the zoom factor setting unit 120 may include information about whether to magnify or minify the zoom area, and a magnification or minification ratio. Also, the user may input the information to the zoom factor setting unit 120 using a control device, for example, using one or more of a mouse, a touch, a remote control, and the like.

Also, the zoom factor setting unit 120 may determine a range of the magnification or minification ratio that may be set for the zoom area, based on the color information and the depth information of the zoom area. For example, when a color image having a low resolution is magnified at a high ratio, the color image in the zoom area may be subject to distortion. Accordingly, the zoom factor setting unit 120 may limit the magnification ratio of the zoom factor within a range in which distortion associated with magnification may be prevented from occurring in the zoom area.

The mode selecting unit 130 may select a zoom mode to be applied to the zoom area in the color image and the depth image, among a two-dimensional (2D) zoom mode, a 3D zoom mode, and an intermediate dimensional zoom mode of the 2D zoom mode and the 3D zoom mode. The zoom mode may be automatically or manually selected.

In this instance, the 2D zoom mode may correspond to a zoom mode for scaling a size of the zoom area in the color image and the depth image, and the 3D zoom mode and the intermediate dimensional zoom mode may correspond to a zoom mode for scaling depth information of the zoom area.

Figure 3:
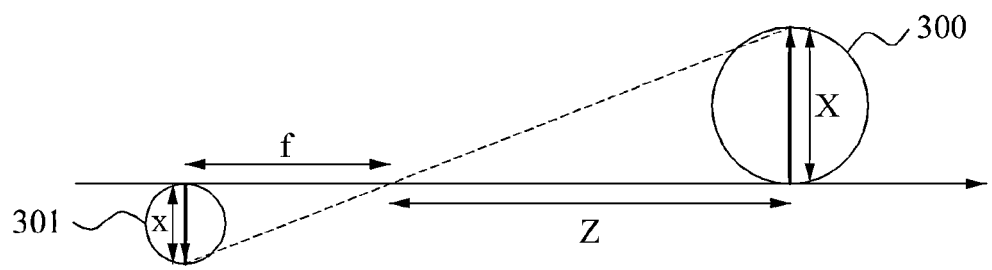
FIG. 3 illustrates operation of a two-dimensional (2D) zoom mode according to an example embodiment.
Figure 3:
Figure 3:
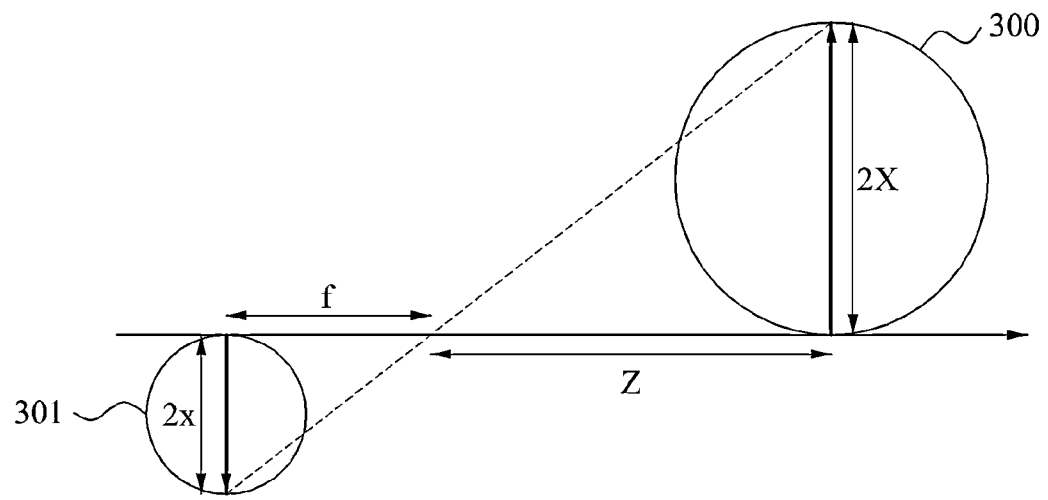
Figure 4:
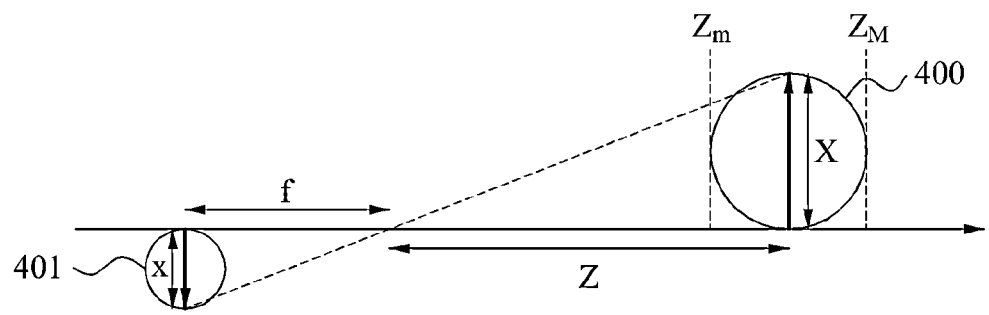
FIG. 4 illustrates operation of an intermediate dimensional zoom mode according to an example embodiment.
Figure 4:
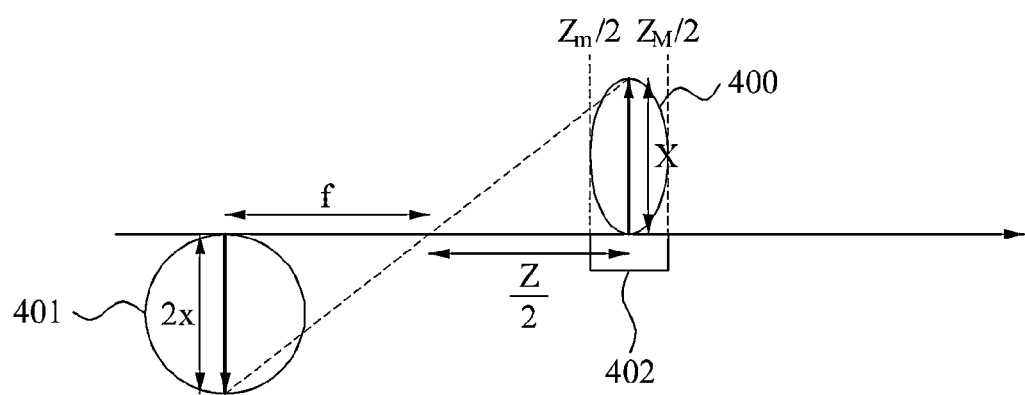
Figure 5:
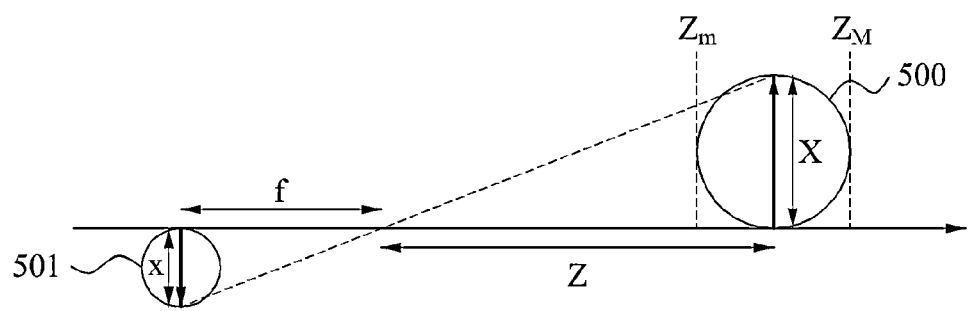
FIG. 5 illustrates operation of a 3D zoom mode according to an example embodiment.
Figure 5:
Figure 5:
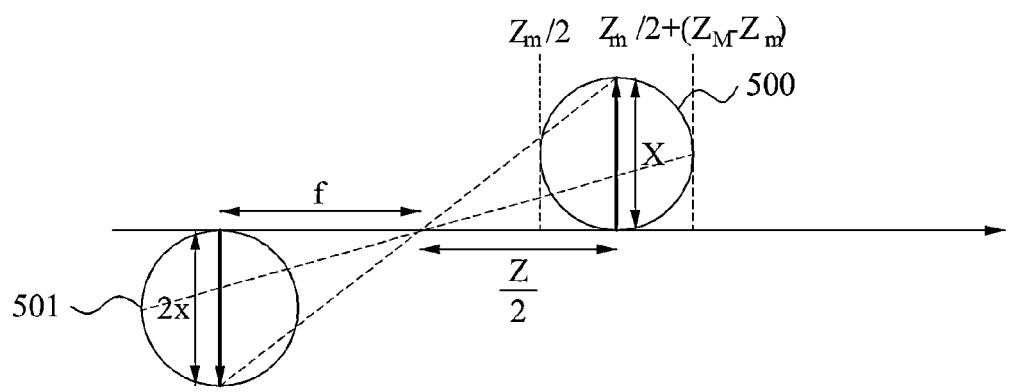

A further detailed description of scaling the zoom area using the 2D zoom mode, the 3D zoom mode, and the intermediate dimensional zoom mode is provided with reference to FIGS. 3 through 5.

In this instance, the mode selecting unit 130 may select the zoom mode based on an input from the user. Also, the mode selecting unit 130 may (automatically) select the zoom mode based on the color image and the depth image, and the zoom factor.

For example, the mode selecting unit 130 may change the zoom mode to be applied to the zoom area as the zoom factor changes.

Figure 6:
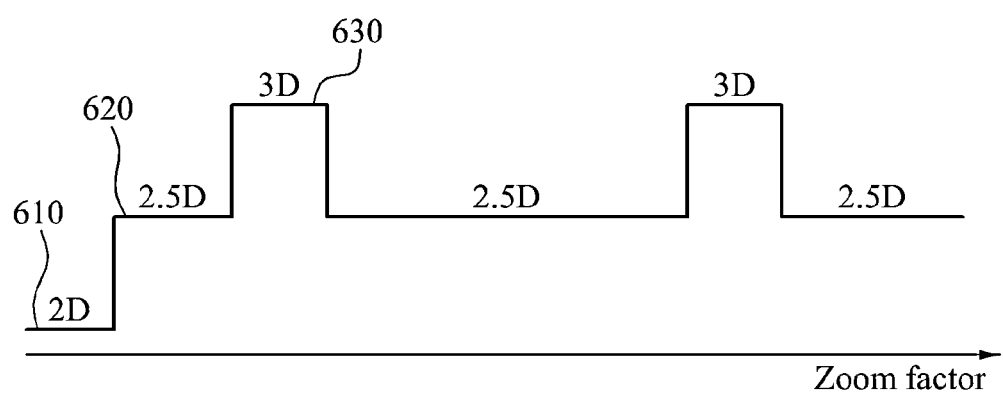
FIG. 6 illustrates zoom mode switching according to an example embodiment.

A further detailed description of the mode selecting unit 130 changing the zoom mode based on the zoom factor is provided with reference to FIG. 6.

For example, when additional information is present in the color image or depth information is absent in the zoom area, applying the intermediate dimensional zoom mode or the 3D zoom mode for scaling depth information may be unsuitable. Accordingly, the mode selecting unit 130 may select the 2D zoom mode. In this instance, the additional information may correspond to information in which depth information is absent, for example, subtitles, and may be displayed independently from an object in the color image. That is, when an area in an image for which a zoom operation is to be performed on lacks depth information (e.g., an area in the image including only or primarily subtitles), then using a 2D zoom mode may be more appropriate than using an intermediate or 3D zoom mode.

Also, a depth zone allowing the user to experience fatigue-free 3D viewing through a 3D display may be present in the 3D image. In this instance, the depth zone may correspond to a comfort zone or a Panum's fusional area.

When depth information of the zoom area to be scaled using the intermediate dimensional zoom mode or the 3D zoom mode is outside of the depth zone allowing stereoscopic 3D perception, the user may have a feeling of fatigue while viewing the 3D image.

Accordingly, when depth information of the zoom area to be scaled using the intermediate dimensional zoom mode or the 3D zoom mode is outside of the depth zone allowing stereoscopic 3D perception, the mode selecting unit 130 may select the 2D zoom mode to allow the user to view the 3D image with less visual discomfort.

An intermediate dimensional zoom mode or a 3D zoom mode may be used in cases where an area in an image for which a zoom operation is to be performed on (e.g., a zoom area to be scaled), when that area includes depth information, and the depth information of the area is inside a depth zone which would not induce user fatigue when viewing the 3D image. Also, the intermediate dimensional zoom mode may allow a fewer number of calculations than the 3D zoom mode, but may be likely to have distortion in the zoom area, similar to a 2.1D zoom mode, a 2.5D zoom mode, and a 2.7D zoom mode.

Accordingly, when the zoom area is scaled using the intermediate dimensional zoom mode, the mode selecting unit 130 may determine whether distortion is likely to occur, and when it is determined that distortion is unlikely to occur, may select the intermediate dimensional zoom mode, and when it is determined that distortion is likely to occur, may select the 3D zoom mode.

More particularly, the mode selecting unit 130 may estimate a range of depth information of the zoom area to be scaled using the intermediate dimensional zoom mode, and may determine whether a difference between the estimated range of depth information and a range of depth information of a current zoom area is less than or equal to a threshold value. In this instance, the mode selecting unit 130 may determine the range of depth information based on a difference between a greatest amount of depth information and a least amount of depth information in the zoom area.

When the difference between the estimated range of depth information and the range of depth information of the current zoom area is less than or equal to the threshold value, the mode selecting unit 130 may determine that distortion perceivable by the user is absent, and may select the intermediate dimensional zoom mode.

When the difference between the estimated range of depth information and the range of depth information of the current zoom area exceeds the threshold value, the mode selecting unit 130 may determine that distortion perceivable by the user occurs, and may select the 3D zoom mode.

The scaling unit 140 may scale the zoom area using the zoom factor and the zoom mode selected by the zoom selecting unit 130.

When the mode selecting unit 130 selects the intermediate dimensional zoom mode, the scaling unit 140 may scale the depth information of the zoom area based on the zoom factor. For example, when the scaling unit 140 magnifies the zoom area using the zoom factor, the scaling unit 140 may scale depth information of points included in the zoom area in inverse proportion to a size of the zoom area to be magnified. That is, for a first zoom area which is relatively larger than a second zoom area, the depth information for points included in the first zoom area may be scaled to a lesser degree than for the depth information for points included in the second zoom area.

When the mode selecting unit 130 selects the 3D zoom mode, the scaling unit 140 may shift the depth information of the zoom area using the zoom factor. More particularly, the scaling unit 140 may generate a scaled color image and a scaled depth image by converting 3D coordinates of the zoom area based on the zoom factor and by projecting the converting 3D coordinates into a 2D space.

When the mode selecting unit 130 selects the 2D zoom mode, the scaling unit 140 may scale the size of the zoom area in proportion to the zoom factor.

In this instance, a 3D image generating apparatus 101 may generate a 3D image, to which a 3D zoom is applied, by rendering the color image and the depth image in which the zoom area is scaled by the scaling unit 140 and may provide the generated 3D image to the user. In this instance, the 3D image generating apparatus 101 may render the color image and the depth image in which the zoom area is scaled by the scaling unit 140, using view synthesis or depth image based rendering.

Figure 2:
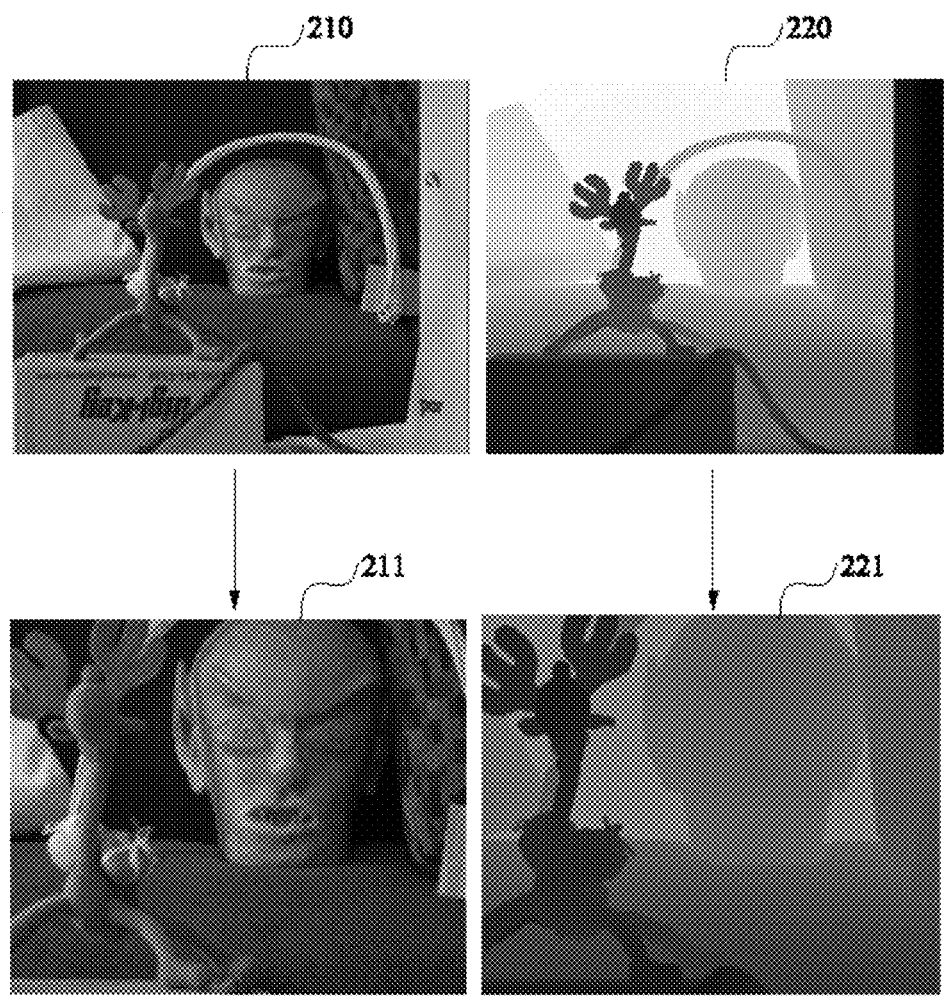
FIG. 2 illustrates changes in a color image and a depth image according to an example embodiment.

FIG. 2 illustrates changes in a color image and a depth image according to an example embodiment.

The image processing apparatus 100 of FIG. 1 may perform a 3D zoom on a zoom area of a color image 210 and a zoom area of a depth image 220, and may output a color image 211 acquired by magnifying the zoom area and a depth image 221 acquired by magnifying the zoom area. As noted above, the zoom area may be selected by a user using a control device, for example.

In this instance, the color image 210 and the depth image 220 may have the same resolution, and may be aligned.

When the color image 210 and the depth image 220 fail to meet the foregoing requirements, the image processing apparatus 100 may execute a correction of the color image 210 and the depth image 220 to meet the foregoing requirements. For example, the image processing apparatus 100 may adjust the resolution of the depth image 220 to the resolution of the color image 210 using a depth super-resolution technique, and may compensate for a difference in viewpoints between the color image 210 and the depth image 220 using a rectification technique, to make the color image 210 and the depth image 220 satisfy the foregoing requirements (e.g., to have the same resolution and to be aligned).

The depth image 220 may correspond to an image obtained by performing image processing, for example, stereo matching, on the color image 210, or an image obtained using a depth camera. In this instance, an area in the depth image 220 may become brighter as a distance between the user and the area increases, and may become darker the closer the user is to the area. Also, depth information may be proportional to the distance between the user and the area. That is, a brightest area in the depth image 220 may correspond to a background having a greatest amount of depth information. Likewise, a darkest area in the depth image 220 may correspond to a foreground, for example an object in the foreground, having a least amount of depth information. Depth information may be based on, for example, disparity values, depth values (z-values), and the like. Generally, a foreground object may have a lower depth value than a background object.

Also, as shown in FIG. 2, the depth image 221 acquired by magnifying the zoom area may be darker than the depth image 220. That is, the image processing apparatus 100 may perform a 3D zoom on the zoom area by scaling the depth information of the zoom area.

In a case in which the 3D zoom mode is used, the image processing apparatus 100 may scale the zoom area while maintaining an original depth range of the zoom area.

FIG. 3 illustrates operation of a 2D zoom mode according to an example embodiment.

The 2D zoom mode may have the same effect as photographing a 3D object of which a size is changed in reality by increasing or reducing a size of a 3D object included in a color image and a depth image.

The 2D zoom mode may work in such a way of changing a spatial size of a 2D image to allow a user to perceive a 3D image as if a size of the 3D image is changed in reality.

The 2D zoom mode may be the easiest to be used by a user unfamiliar with 3D contents, because depth information is unchanged in the 2D zoom mode. For example, when depth information is changed, a sense of depth in an area, in which information such as, for example, subtitles or a logo, is displayed, may be changed in opposition to an intent of a content creator. Accordingly, the mode selecting unit 130 may select the 2D zoom mode.

The scaling unit 140 may scale a zoom area in a color image and a depth image spatially. In this instance, the scaling unit 140 may scale the zoom area while maintaining depth information of the zoom area.

For example, the scaling unit 140 may magnify the zoom area by enhancing a resolution of the zoom area using a super-resolution technique or upsampling the zoom area. Also, the scaling unit 140 may minify the zoom area by downsampling the zoom area.

In FIG. 3, "f" denotes a focal length of a camera lens, and "Z" denotes a distance between the lens and a 3D object 300. Also, "x" denotes a size of a 3D object 301 obtained with the camera, and "X" denotes a size of the 3D object 300 (e.g., after a zoom operation is performed).

As shown in FIG. 3, the scaling unit 140 may increase the size x of the 3D object 301 obtained with the camera to 2x by increasing the size X of the 3D object 300 to 2X. However, depth information pertaining to the 3D object is unchanged. For example, as shown in FIG. 3, the distance between the lens and the 3D object remains "Z".

FIG. 4 illustrates operation of an intermediate dimensional zoom mode according to an example embodiment.

The intermediate dimensional zoom mode may provide an effect of making a 3D object appear to be closer to or further away from a user or a camera, by scaling depth information of a zoom area based on a zoom factor.

For example, when a double zoom is applied to a 3D object 400, the scaling unit 140 of FIG. 1 may scale distance information Z of the 3D object 400 to Z/2. In this instance, a size of the 3D object 400 may be maintained to be X, while a size x of a 3D object 401 obtained with a camera may be increased (doubled) to be 2x, as shown in FIG. 4. Thus, when a zoom is applied to a 3D object of a certain magnitude, the size of the 3D object with the camera may be increased or decreased in proportion to the magnitude of the applied zoom.

In particular, the intermediate dimensional zoom mode may work by way of scaling depth information using the zoom factor to zoom the 3D object 400, and accordingly, a number of calculations of the intermediate dimensional zoom mode may be similar to that of the 2D zoom mode. For example, if a double zoom is applied having a zoom factor of 2, then the depth information may be scaled in an inversely proportional manner (e.g., the depth information may be halved).

However, the intermediate dimensional zoom mode may involve scaling of a depth range of the zoom area when scaling depth information.

For example, when minimum depth information of the zoom area is Zm and maximum depth information of the zoom area is $Z_M$, a depth range of the zoom area may be $Z_M$–Zm. When a double zoom is applied to the zoom area, the minimum depth information of the zoom area may be scaled to Zm/2 and the maximum depth information of the zoom area may be scaled to $Z_M/2$. In this example, a depth range 402 of the scaled zoom area may be changed from $Z_M$–Zm to $Z_M/2$–Zm/2.

In this instance, the 3D object 400 included in the zoom area may be susceptible to distortion along the (scaled) depth range 402 of the scaled zoom area, as shown in FIG. 4. As noted above, if it is determined that the distortion may be noticeable to a user, the 3D zoom mode may be more appropriate.

FIG. 5 illustrates operation of a 3D zoom mode according to an example embodiment.

The 3D zoom mode may have an increased number of calculations compared to the intermediate dimensional zoom mode, but may enable distortion-free scaling of depth information of a zoom area.

When the 3D zoom mode is selected, the scaling unit 140 may scale a color image and a depth image by transforming 3D coordinates of the zoom area based on the zoom factor, and by projecting the transformed 3D coordinates into a 2D space.

More particularly, when a double zoom is applied to a 3D object 500, the scaling unit 140 may transform spatial coordinates (x,y,z) of the 3D object 500 to spatial coordinates (x,y,z') by shifting depth information of each pixel of a zoom area. In this instance, the scaling unit 140 may shift the depth information by applying an addition or subtraction operation of a predetermined value to depth pixels of the zoom area. For example, the z value may be changed to a value of z', based on the addition or subtraction operation.

For example, when distance information Z of the 3D object 500 is scaled to Z/2, depth information $Z_m$ of a pixel having minimum depth information in the zoom area may be scaled to $Z_m/2$. Depth information $Z_M$ of a pixel having maximum depth information in the zoom area may be scaled to $Z_m/2+(Z_M-Z_m)$. It can be seen that the scaled depth range of the scaled zoom area may be greater in the 3D zoom mode when compared to the scaled depth range of the scaled zoom area in the intermediate dimensional zoom mode. For example, in the 3D zoom mode, the maximum depth information of the zoom area may be modified to include the difference between the maximum depth information of the zoom area $Z_M$ and the minimum depth information of the zoom area $Z_m$.

Further to this example, the scaling unit 140 may scale depth information of each pixel included in the zoom area while maintaining a difference in depth information between the pixels to prevent distortion from occurring in the zoom area. For example, the scaling unit 140 may select one pixel among pixels included in the zoom area to be a reference pixel, and may calculate a distance between the reference pixel and each pixel of the zoom area. Also, the scaling unit 140 may scale depth information of each pixel of the zoom area by determining a sum of the calculated distance and depth information of the reference pixel to be depth information of each pixel of the zoom area. In this instance, unless the depth information of the reference pixel is the minimum in the zoom area, the calculated distance may be a negative value.

In this instance, the 3D image generating apparatus 101 may need a color image and a depth image in a form of a 2D image to render a color image and a depth image in which a zoom area is scaled by the scaling unit 140. Accordingly, the scaling unit 140 may require an additional operation for generating a mesh using 3D coordinates to transform a color image and a depth image in two dimensions by projecting 3D coordinates having the scaled depth information into 2D coordinates.

When the 3D image generating apparatus 101 includes a 3D graphic engine, 3D-to-2D projection may be performed. However, when the 3D image generating apparatus 101 executes depth image based rendering, a number of calculations required to project 3D coordinates having the scaled depth information into 2D coordinates may become additional overhead.

FIG. 6 illustrates zoom mode switching according to an example embodiment.

Each of a 2D zoom mode, a 3D zoom mode, and an intermediate dimensional zoom mode in use for the image processing apparatus 100 may have an advantage and a disadvantage, and a best zoom mode may be different based on or according to a zoom factor or a zoom area.

For example, a 2D zoom mode having a lowest number of calculations may be the most efficient because subtitles or additional information lacking a stereoscopic 3D effect is irrelevant to a change in depth information. Also, a 3D zoom mode may provide a 3D zoom allowing a distortion-free change in depth information, however, because the 3D zoom mode has a relatively higher number of calculations, an intermediate dimensional zoom mode may be more efficient based on a zoom factor.

Accordingly, the image processing apparatus 100 may switch among zoom modes adaptively or selectively rather than using only one zoom mode.

In FIG. 6, an example of the image processing apparatus 100 switching among a 2D zoom mode 610, a 2.5D zoom mode 620, and a 3D zoom mode 630 in the process of zooming gradually based on a zoom factor is provided. In this instance, the 2.5D zoom mode 620 may correspond to an intermediate dimensional zoom mode.

The 2.5D zoom mode 620 and the 3D zoom mode 630 may make a zoom area appear to be closer to or further away when compared to the remaining area, by changing depth information of the zoom area. However, a depth zone allowing a user to experience fatigue-free 3D viewing through a 3D display may be present in a 3D image. In this instance, the depth zone may correspond to a comfort zone or a Panum's fusional area.

For example, when depth information of the zoom area scaled based on the zoom factor is outside of the comfort zone, a feeling of discomfort of the user viewing the 3D image may increase.

Accordingly, when depth information of the zoom area scaled based on the zoom factor is outside of the comfort zone, the mode selecting unit 130 of the image processing apparatus 100 may select the 2D zoom mode 610 to reduce fatigue resulting from viewing the 3D image.

When depth information of the zoom area scaled based on the zoom factor is within the comfort zone, the mode selecting unit 130 may select the 2.5D zoom mode 620 to provide the user with the 3D image in which the zoom area looks closer or further away compared to the remaining area.

When switching is made from the 2.5D zoom mode 620 to the 3D zoom mode 630 on a 3D display having a narrow comfort zone, the mode selecting unit 130 may insert the 2D zoom mode 610 between the 2.5D zoom mode 620 and the 3D zoom mode 630, selectively, to retard or slow down the movement of depth information changing based on the zoom factor out of the comfort zone.

The 2.5D zoom mode 620 may change a depth range of the zoom area, however, when a change in the depth range is less than a threshold value, the user may fail to perceive the changed depth range. In this instance, the threshold value for perception of the changed depth range may correspond to a just noticeable depth difference (JNDD). That is, the threshold value may correspond to a statistical probability that a user will notice or perceive a distortion in the image based on human sensory characteristics (e.g., visual characteristics of the human eye).

For example, when the depth range of the zoom area is reduced to half as shown in FIG. 4, the user may perceive the changed depth range. However, when the depth range of the zoom area is changed to a small extent, the user may fail to perceive the changed depth range.

That is, when a difference between the changed depth range of the zoom area associated with the 2.5D zoom mode 620 and an original depth range of the zoom area is less than or equal to the JNDD, the user may fail to distinguish a 3D image scaled using the 2.5D zoom mode 620 from a 3D image scaled using the 3D zoom mode 630. In this instance, the mode selecting unit 130 may select the 2.5D zoom mode 620 to enable the scaling unit 140 to scale the zoom area with a fewer number of calculations rather than selecting the 3D zoom mode 630 which uses a relatively higher number of calculations.

When a difference between the changed depth range of the zoom area associated with the 2.5D zoom mode 620 and an original depth range of the zoom area exceeds the JNDD, the mode selecting unit 130 may select the 3D zoom mode 630 to prevent a distortion perceivable by the user from occurring in the 3D image. Alternatively, the 2.5D zoom mode may be selected when the difference between the changed depth range of the zoom area associated with the 2.5D zoom mode 620 and an original depth range of the zoom area is less than the JNDD, and the 3D zoom mode may be selected when the difference between the changed depth range of the zoom area associated with the 2.5D zoom mode 620 and an original depth range of the zoom area is greater than or equal to the JNDD.

By way of example, to zoom gradually based on a zoom factor, the mode selecting unit 130 may change a zoom mode to be selected among the 2D zoom mode 610, the 2.5D zoom mode 620, and the 3D zoom mode 630 to enable the scaling unit 140 to scale a color image and a depth image using an optimal zoom mode for a zoom factor.

Figure 7:
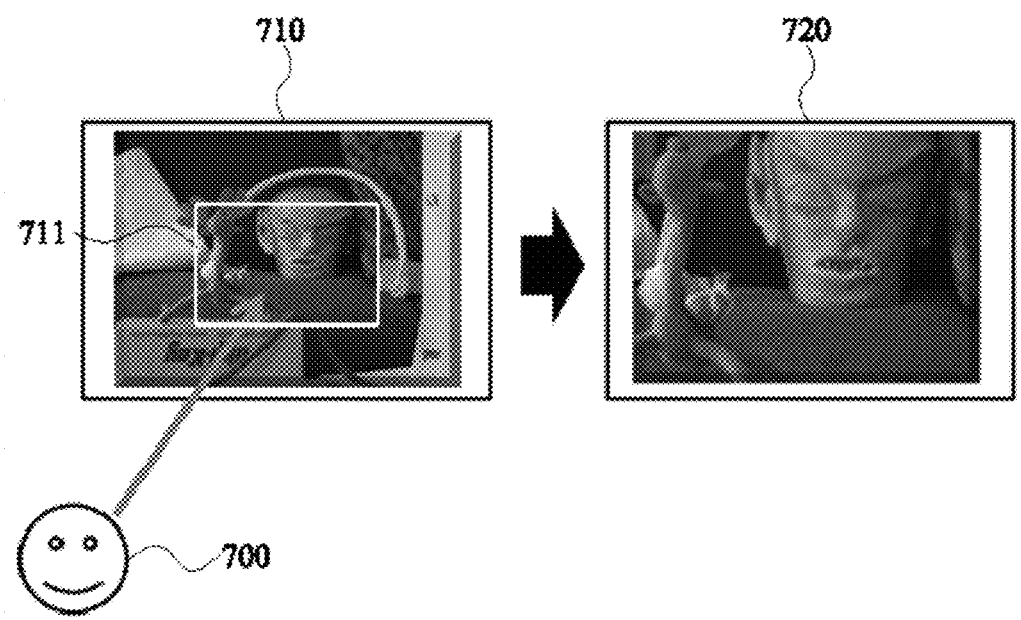
FIG. 7 illustrates zooming a 3D image based on a line of sight of a user according to an example embodiment.

FIG. 7 illustrates zooming a 3D image based on a line of sight of a user according to an example embodiment.

The zoom area setting unit 110 may perceive a line of sight of a user 700 using a camera facing the user.

The zoom area setting unit 110 may identify an area 711 viewed by the user 700 in a 3D image 710 using the perceived line of sight. The 3D image may be displayed by a display device, such as a television, computer, smart phone, or any electronic device capable of displaying a 3D image, for example. The display may include a liquid crystal display (LCD), a light emitting diode (LED) display, an organic light emitting diode (OLED) display, a plasma display panel (PDP), a cathode ray tube (CRT) display, and the like, for example. However, the disclosure is not so limited and may include other types of displays.

The zoom area setting unit 110 may set the viewed area 711 to be a zoom area.

The scaling unit 140 may scale the area 711 in a depth image and a color image using a zoom mode selected by the user 700 or the mode selecting unit 130. The zoom mode may be selected by the user using the control device or a desired zoom mode may be detected via the camera based on a user input (e.g., using hand gestures).

The 3D image generating apparatus 101 may generate a 3D image 720 through magnification of the area 711 using the depth image and the color image scaled by the scaling unit 140.

Figure 8:
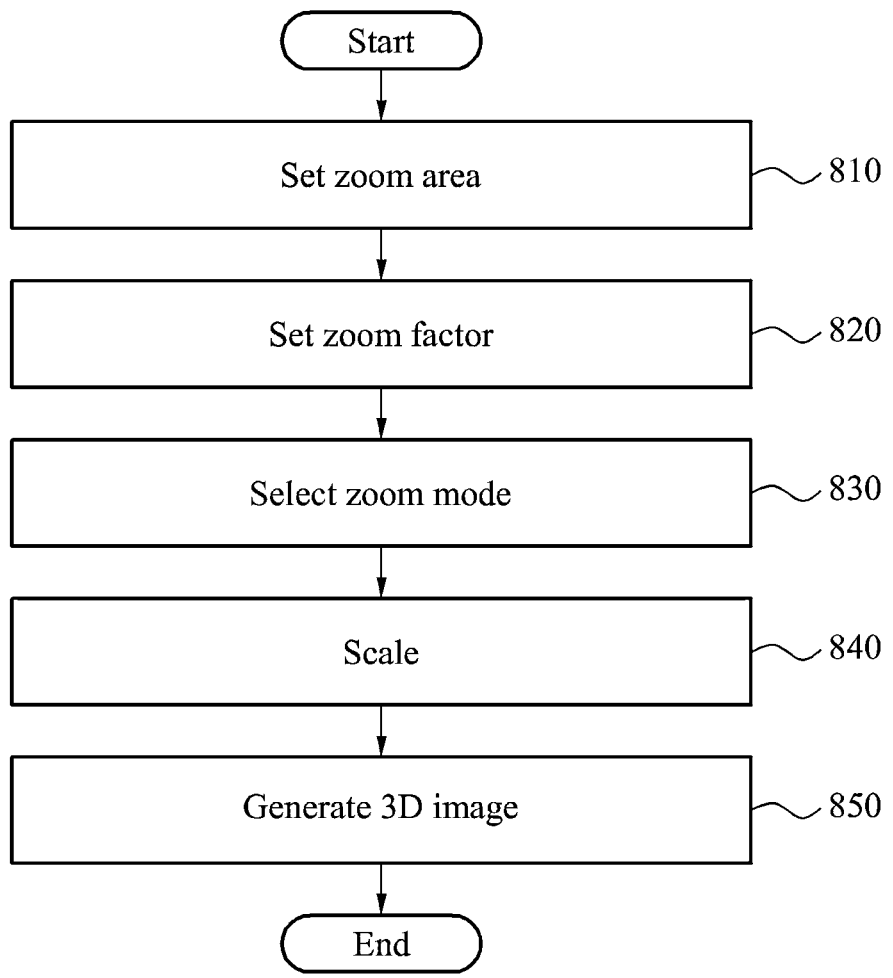
FIG. 8 illustrates an image processing method according to an example embodiment.

FIG. 8 illustrates an image processing method according to an example embodiment.

In operation 810, the zoom area setting unit 110 may set a zoom area to be zoomed in a color image and a depth image based on an area in a 3D image selected by a user. More particularly, the zoom area setting unit 110 may identify an area in the color image and the depth image corresponding to the area selected by the user, and may set the identified area to be the zoom area. The area selected by the user may be detected using the line of sight process discussed above.

In operation 820, the zoom factor setting unit 120 may set a zoom factor indicating magnification or minification of the zoom area based on information input from the user. Also, the zoom factor setting unit 120 may analyze color information and depth information of the zoom area set by the zoom area setting unit 110, and may set the zoom factor based on a result of the analysis.

In this instance, the information input from the user to the zoom factor setting unit 120 may include information about whether to magnify or minify the zoom area, and a magnification or minification ratio. Also, the zoom factor setting unit 120 may determine a range of the magnification or minification ratio that may be set for the zoom area, based on the color information and the depth information of the zoom area.

In operation 830, the mode selecting unit 130 may select a zoom mode to be applied to the zoom area set in operation 810 among a plurality of zoom modes. In this instance, the mode selecting unit 130 may select one zoom mode among a 2D zoom mode for scaling a size of the zoom area in the color image and the depth image, and a 3D zoom mode and an intermediate dimensional zoom mode for scaling depth information of the zoom area.

In this instance, the mode selecting unit 130 may select the zoom mode based on an input from the user. Also, the mode selecting unit 130 may select the zoom mode automatically based on the color image or the depth image, and the zoom factor set in operation 820. For example, the mode selecting unit 130 may change the zoom mode to be applied to the zoom area as the zoom factor changes. That is, for example, as a zoom factor changes, a difference in the changed depth range of the zoom area associated with a zoom mode (e.g., a 2.5D zoom mode) and the original depth range also changes. Based on the magnitude of the changed depth range, distortion may be more likely to occur, and thus a different zoom mode (e.g., a 3D zoom mode) may be more appropriate.

A process of the mode selecting unit 130 selecting the zoom mode is described in further detail with reference to FIG. 9.

In operation 840, the scaling unit 140 may scale the zoom area using the zoom factor set in operation 820 and the zoom mode selected in operation 830.

When the intermediate dimensional zoom mode is selected in operation 830, the scaling unit 140 may scale depth information of the zoom area based on the zoom factor. For example, when the zoom area is to be magnified using the zoom factor, the scaling unit 140 may scale depth information of points included in the zoom area in inverse proportion to a size of the zoom area to be magnified.

When the 3D zoom mode is selected in operation 830, the scaling unit 140 may shift depth information of the zoom area using the zoom factor. More particularly, the scaling unit 140 may generate a scaled color image and a scaled depth image by transforming 3D coordinates of the zoom area based on the zoom factor and by projecting the transformed 3D coordinates into a 2D space.

When the 2D zoom mode is selected in operation 830, the scaling unit 140 may scale the size of the zoom area in proportion to the zoom factor.

In operation 850, the 3D image generating apparatus 101 may generate a 3D image by rendering the color image and the depth image in which the zoom area is scaled in operation 840. In this instance, the 3D image generating apparatus 101 may render the color image and the depth image, in which the zoom area is scaled in operation 840, using view synthesis or depth image based rendering.

Figure 9:
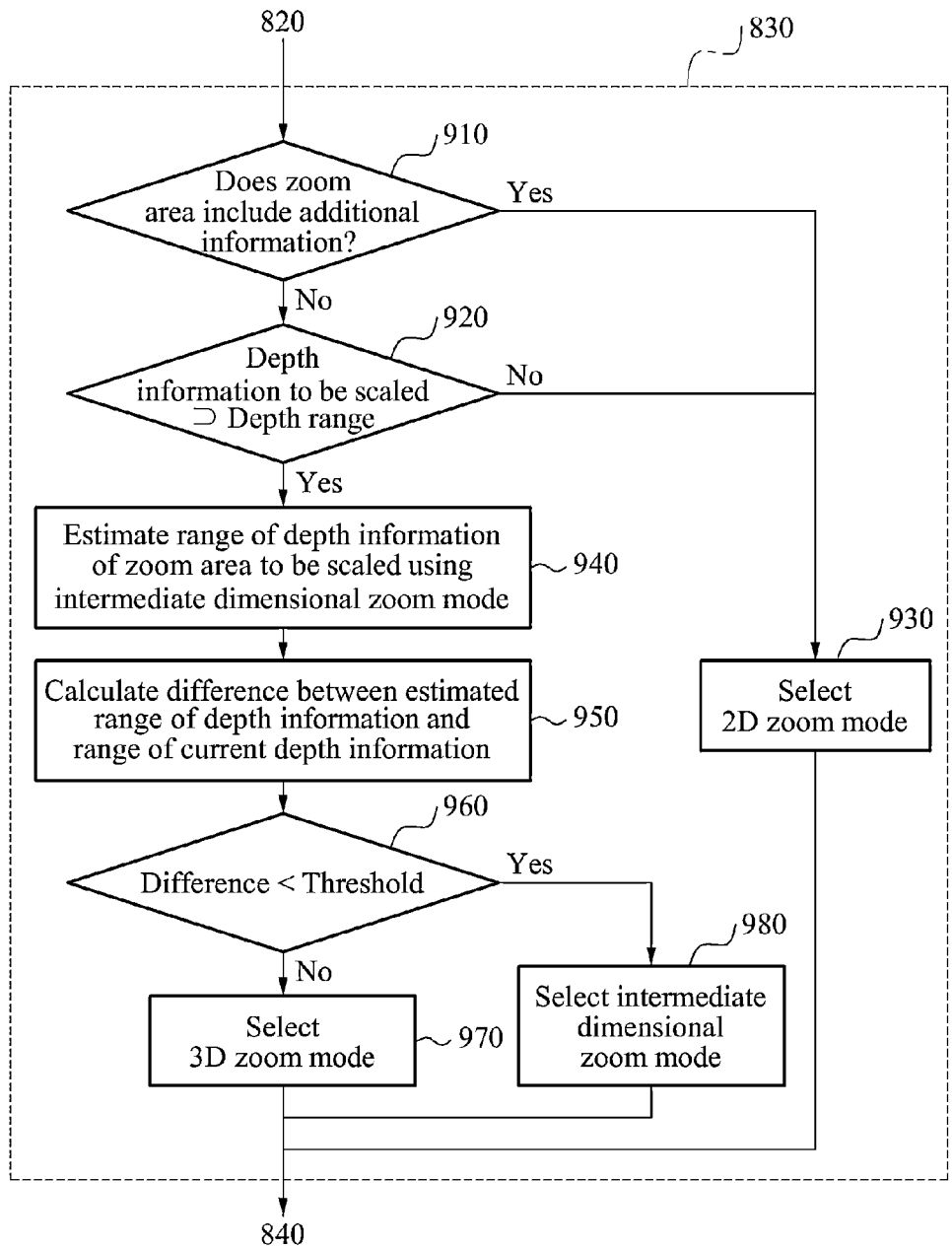
FIG. 9 illustrates a method of selecting a zoom mode according to an example embodiment.

FIG. 9 illustrates a method of selecting a zoom mode according to an example embodiment. In this instance, operations 910 through 980 may be included in operation 830 of FIG. 8.

In operation 910, the mode selecting unit 130 may determine whether the zoom area includes additional information of the color image. In this instance, the additional information may correspond to information in which depth information is absent, for example, subtitles, and may be displayed independently from an object in the color image.

When the zoom area includes the additional information of the color image, the mode selecting unit 130 may select the 2D zoom mode in operation 930.

In operation 920, the mode selecting unit 130 may determine whether depth information of the zoom area to be scaled based on the zoom factor is within a preset depth range. In this instance, the preset depth range may correspond to a comfort zone or a Panum's fusional area that may allow the user to experience fatigue-free 3D viewing.

More particularly, when the depth information of the zoom area to be scaled based on the zoom factor is outside of the comfort zone, the mode selecting unit 130 may select the 2D zoom mode to allow the user to view the 3D image with less visual discomfort, in operation 930.

In operation 930, the mode selecting unit 130 may select the 2D zoom mode.

In operation 940, the mode selecting unit 130 may estimate a range of depth information of the zoom area to be scaled using the intermediate dimensional zoom mode. In this instance, the mode selecting unit 130 may determine the range of depth information based on a difference between a greatest amount of depth information and a least amount of depth information in the zoom area.

In operation 950, the mode selecting unit 130 may calculate a difference between the estimated range of depth information and a range of depth information of a current zoom area.

In operation 960, the mode selecting unit 130 may determine whether the calculated difference is less than a threshold value.

When the calculated difference is less than the threshold value, the mode selecting unit 130 may determine that a distortion perceivable by the user is absent, and may proceed with operation 960. Also, when the calculated difference exceeds or equals the threshold value, the mode selecting unit 130 may determine that a distortion perceivable by the user occurs, and may proceed to operation 970.

In operation 970, the mode selecting unit 130 may select the 3D zoom mode.

In operation 980, the mode selecting unit 130 may select the intermediate dimensional zoom mode, for example, a 2.5D zoom mode.

The apparatuses and methods according to the above-described example embodiments may use one or more processors. For example, a processing device may be implemented using one or more general-purpose or special purpose computers, such as, for example, a processor, an image processor, a controller and an arithmetic logic unit, a central processing unit (CPU), a digital signal processor (DSP), a microcomputer, a field programmable array, a programmable logic unit, an application-specific integrated circuit (ASIC), a microprocessor or any other device capable of responding to and executing instructions in a defined manner.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although example embodiments have been shown and described, it would be appreciated by those skilled in the art that changes may be made to these embodiments without departing from the principles and spirit of the disclosure, the scope of which is defined by the claims and their equivalents.

What is claimed is:

1. An image processing apparatus comprising:
   a processor; and
   a memory including computer readable instructions, which when executed by the processor cause the processor to,
      select a zoom mode to be applied to a zoom area in a color image and a depth image, the zoom mode being selected from among a two-dimensional (2D) zoom mode, a three-dimensional (3D) zoom mode, and an intermediate dimensional zoom mode between the 2D zoom mode and the 3D zoom mode; and
      scale the zoom area based on a zoom factor indicating magnification or minification of the zoom area and the selected zoom mode, wherein the processor is configured to select the zoom mode by,
      estimating a range of depth information of the zoom area to be scaled using the intermediate dimensional zoom mode, and
      selecting the intermediate dimensional zoom mode if a difference between the estimated range of depth information and a range of depth information of a current zoom area is less than equal to a threshold value.

2. The image processing apparatus of claim 1, wherein the intermediate dimensional zoom mode has a fewer number of calculations than the 3D zoom mode.

3. The image processing apparatus of claim 1, wherein, in the intermediate dimensional zoom mode, the processor is configured to scale the depth information of the zoom area based on the zoom factor.

4. The image processing apparatus of claim 3, wherein the processor is configured to scale the depth information of the points included in the zoom area in inverse proportion to a size of the zoom area to be magnified if the processor magnifies the zoom area using the zoom factor.

5. The image processing apparatus of claim 1, wherein the processor is configured to determine the range of depth information based on a difference between a greatest amount of depth information and a least amount of depth information in the zoom area.

6. The image processing apparatus of claim 1, wherein, in the 3D zoom mode, the processor is configured to shift the depth information of the zoom area based on the zoom factor.

7. The image processing apparatus of claim 6, wherein, in the 3D zoom mode, the processor is configured to generate a scaled color image and a scaled depth image by transforming 3D coordinates of the zoom area based on the zoom factor and by projecting the transformed 3D coordinates into a 2D space.

8. The image processing apparatus of claim 1, wherein the processor is configured to estimate a range of depth information of the zoom area to be scaled using the intermediate dimensional zoom mode, and select the 3D zoom mode if a difference between the estimated range of depth information and a range of depth information of a current zoom area exceeds a threshold value.

9. The image processing apparatus of claim 1, wherein in the 2D zoom mode, the processor is configured to scale a size of the zoom area in proportion to the zoom factor.

10. The image processing apparatus of claim 1, wherein the processor is configured to determine whether the depth information of the zoom area to be scaled is included in a depth zone, and select the 2D zoom mode if the depth information of the zoom area to be scaled is outside of the desired depth zone.

11. The image processing apparatus of claim 10, wherein the depth zone corresponds to a comfort zone or a Panum's fusional area in which fatigue experienced by a user viewing a 3D image is minimized.

12. The image processing apparatus of claim 1, wherein the processor is configured to select the 2D zoom mode if the zoom area includes additional information of the color image or information lacking the depth information.

13. The image processing apparatus of claim 1, wherein the processor is configured to,
   set a zoom area of a color image and a zoom area of a depth image on an area in a 3D image based on a selection by a user, and
   set a zoom factor based on color information and the depth information in the zoom area, and information received from the user.

14. The image processing apparatus of claim 13, wherein the processor is configured to limit a zoom factor based on a resolution of the 3D image.

15. An image processing apparatus comprising:
   a processor; and
   a memory including computer readable instructions, which when executed by the processor cause the processor to,
      set a zoom area in a color image and a depth image to be zoomed; and
      generate a scaled color image and a scaled depth image based on a selected zoom mode from among a two-dimensional (2D) zoom mode, a three-dimensional (3D) zoom mode, and an intermediate dimensional zoom mode between the 2D zoom mode and the 3D zoom mode, wherein the processor is configured to select a zoom mode by,
      estimating a range of depth information of the zoom area to be scaled using the intermediate dimensional zoom mode, and
      selecting the intermediate dimensional zoom mode if a difference between the estimated range of depth information and a range of depth information of a current zoom area is less than or equal to a threshold value.

16. The image processing apparatus of claim 15, wherein in the 3D zoom mode, the processor is configured to transform 3D coordinates of the zoom area based on a zoom factor and by projecting the transformed 3D coordinates into a 2D space.

17. The image processing apparatus of claim 15, wherein, in the 3D zoom mode, the processor is configured to transform the 3D coordinates of the zoom area by shifting the depth information of the zoom area based on the zoom factor.

18. The image processing apparatus of claim 15, wherein, in the intermediate dimensional zoom mode, the processor is configured to scale the depth information of the zoom area based on a zoom factor by scaling the depth information of points included in the zoom area in inverse proportion to a size of the zoom area to be magnified.

19. The image processing apparatus of claim 15, wherein, in the 2D zoom mode, the processor is configured to scale the size of the zoom area in proportion to a zoom factor.

20. An image processing method comprising:
- selecting a zoom mode to be applied to a zoom area in a color image and a depth image from among a two-dimensional (2D) zoom mode, a three-dimensional (3D) zoom mode, and an intermediate dimensional zoom mode between the 2D zoom mode and the 3D zoom mode; and
- scaling the zoom area based on a zoom factor and the selected zoom mode, wherein the selecting the zoom mode includes,
  - estimating a range of depth information of the zoom area to be scaled using the intermediate dimensional zoom mode, and
  - selecting the intermediate dimensional zoom mode if a difference between the estimated range of depth information and a range of depth information of a current zoom area is less than or equal to a threshold value.

21. The image processing method of claim 20, wherein the intermediate dimensional zoom mode has a fewer number of calculations than the 3D zoom mode.

22. The image processing method of claim 20, wherein in the intermediate dimensional zoom mode, the scaling comprises scaling the depth information of the zoom area based on the zoom factor.

23. The image processing method of claim 20, wherein, in the 3D zoom mode, the scaling comprises shifting the depth information of the zoom area based on the zoom factor.

24. An image processing method comprising:
- setting a zoom area based on an area in an image selected by a user;
- selecting a zoom factor for the set zoom area based on an input from the user; and
- adaptively changing between zoom modes to be applied to the zoom area, among a plurality of zoom modes, in response to a change in the selected zoom factor, wherein the plurality of zoom modes include a two-dimensional (2D) zoom mode, a three-dimensional (3D) zoom mode, and an intermediate dimensional zoom mode between the 2D zoom mode and the 3D zoom mode, wherein the adaptively changing includes,
  - estimating a range of depth information of the zoom area to be scaled using the intermediate dimensional zoom mode, and
  - selecting the intermediate dimensional zoom mode if a difference between the estimated range of depth information and a range of depth information of a current zoom area is less than or equal to a threshold value.

25. The image processing method of claim 24, wherein the adaptively changing comprises:
- changing to the intermediate dimensional zoom mode or the 3D zoom mode based upon a likelihood of distortion occurring in the zoom area in the intermediate dimensional zoom mode.

26. The image processing method of claim 24, wherein the adaptively changing comprises:
- changing to the intermediate dimensional zoom mode or the 3D zoom mode based upon whether a just noticeable depth difference occurs in the intermediate dimensional zoom mode.

27. The image processing method of claim 24, wherein the adaptively changing comprises:
- determining a first depth range of the zoom area by calculating a difference between minimum depth information and maximum depth information in the zoom area;
- determining a second depth range corresponding to the zoom area to be scaled based upon the selected zoom factor, by calculating a difference between the minimum depth information and the maximum depth information in the zoom area to be scaled;
- calculating a difference between the first depth range and the second depth range; and
- adaptively changing to the intermediate dimensional zoom mode or 3D zoom mode based upon the calculated difference between the first depth range and the second depth range.

* * * * *